(12) United States Patent
Bandy et al.

(10) Patent No.: US 6,188,825 B1
(45) Date of Patent: Feb. 13, 2001

(54) DUST COVER FOR PROTECTING OPTICAL FIBER SLEEVE HOUSING

(75) Inventors: James C. Bandy, Duluth; Norman R. Lampert; Steven E. Sheldon, both of Norcross; Daniel L. Stephenson, Lilburn, all of GA (US)

(73) Assignee: Lucent Technologies, Inc., Murray Hill, NJ (US)

( * ) Notice: Under 35 U.S.C. 154(b), the term of this patent shall be extended for 0 days.

(21) Appl. No.: 09/292,145

(22) Filed: Apr. 15, 1999

(51) Int. Cl.[7] .............................. G02B 6/00; G02B 6/245
(52) U.S. Cl. ........................ 385/134; 385/53; 359/511; 359/513
(58) Field of Search .................... 385/134, 53; 359/507, 359/511, 513

(56) References Cited

U.S. PATENT DOCUMENTS

| | | |
|---|---|---|
| 4,640,575 | 2/1987 | Dumas . |
| 4,712,861 | 12/1987 | Lukas et al. . |
| 4,738,507 | 4/1988 | Palmquist . |
| 4,738,508 | 4/1988 | Palmquist . |
| 5,082,345 | 1/1992 | Cammons et al. . |
| 5,202,949 | 4/1993 | Hileman et al. . |
| 5,212,752 | 5/1993 | Stephenson et al. . |
| 5,335,301 | * 8/1994 | Newman et al. ................ 385/75 |
| 5,363,460 | 11/1994 | Marazzi et al. . |
| 5,506,922 | 4/1996 | Grois et al. . |
| 5,687,268 | 11/1997 | Stephenson et al. . |
| 5,838,855 | * 11/1998 | Stephenson ..................... 385/53 |
| 5,887,098 | 3/1999 | Ernst et al. . |
| 5,896,477 | * 4/1999 | Stephenson ..................... 385/53 |

* cited by examiner

Primary Examiner—Jon Henry

(57) ABSTRACT

A dust cover for protecting a sleeve housing of a fiber optic adapter having opposed interior sidewalls is provided, which includes an elongate member having first and second opposed ends wherein the elongate member has a multifaceted outer surface with at least one planar surface for engaging the opposed interior sidewalls of the fiber optic adapter. The first end of the elongate member is sized and shaped to align the elongate member within the fiber optic adapter and receive the sleeve housing. The first end of the elongate member also includes a longitudinally extending central bore for receiving the sleeve housing and a plurality of landings, which are contiguous the longitudinally extending bore, and which are tapered toward the second end. The landings securely hold the sleeve housing within the central bore of the elongate member. With this arrangement, the dust cover prevents contamination to the optical fiber, is self-aligning, is accessible in panels having deep recesses, and is easily removable from fiber optic adapters, thereby overcoming limitations found in conventional dust covers.

24 Claims, 6 Drawing Sheets

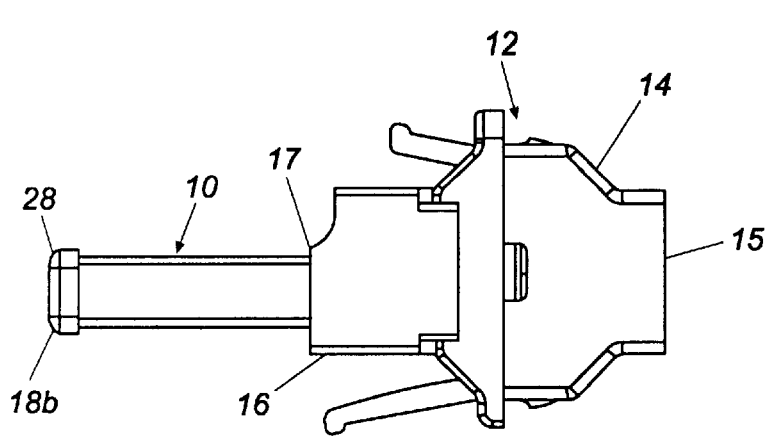# 
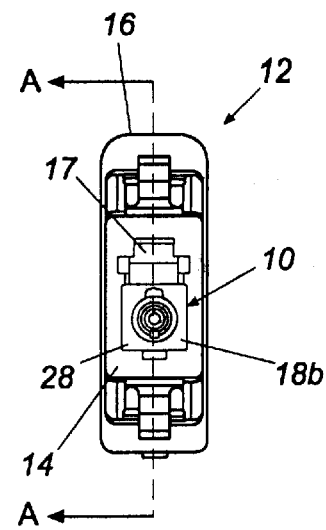
Fig. 10    Fig. 11
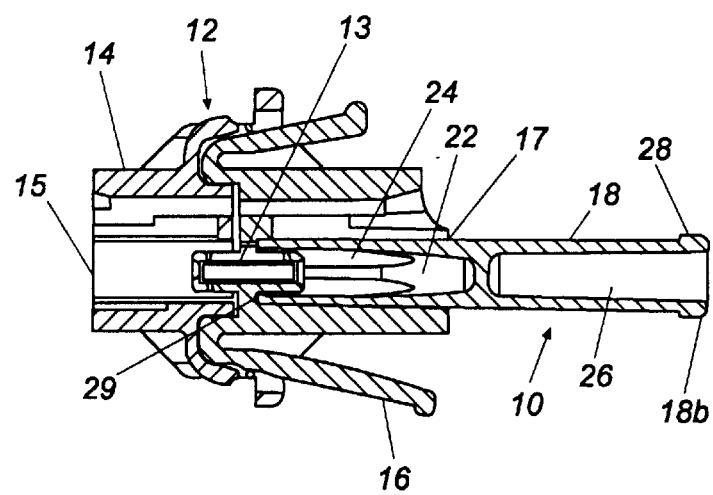
Fig. 12

DUST COVER FOR PROTECTING OPTICAL FIBER SLEEVE HOUSING

FIELD OF THE INVENTION

This invention relates to optical fiber adapters and sleeve housings. More particularly, the invention relates to dust covers for optical fiber adapter sleeve housings.

BACKGROUND OF THE INVENTION

Modern communications systems use optical fibers to replace wire cables. In order to connect optical fibers together, a wide variety of connectors and adapters have been developed and are well known in the art. These connectors and adapters have taken on a wide variety of shapes and sizes, but common among them is the need to provide for uncontaminated optical connection surfaces and precise alignment between optical fibers that are to be coupled.

A common technique for connecting optical fibers is by terminating an optical fiber with a ferrule, and bringing the ferrule into a mating relationship with another ferrule terminating a second fiber. The ferrules are precisely aligned by a cylindrical sleeve which typically receives two ferrules of similar size and coaxially aligns the longitudinal axis of the respective optical cores thereof. The sleeve and a sleeve housing are typically components of a coupler or adapter which securely couples together the plug housings of the respective optical fibers. Examples of such connection systems can be found in U.S. Pat. Nos. 4,738,507 and 4,738,508, both issued to Palmquist and assigned to the assignee of the present invention.

A problem that is encountered when terminating optical fibers is that the fiber ends may be damaged by adverse environment hazards, particularly in the case of an unconnected fiber. In particular, dust and dirt as well as external contact with the fiber may contaminate or damage the optical fiber and thereby impair the optical transmission capabilities of the fiber.

Consequently, when an optical fiber is not in use or is not connected to another fiber, it has been proposed to cover the end of the fiber to prevent dust and other debris from collecting on the exposed surface of the optical fiber or to prevent external contact therewith. For instance, it is known to provide a dust cover for the end of a fiber optic connector, adapter or other body associated with the connector. Such covers are typically used during transport or storage of the optical fiber connector or at other times when the connector is not in use.

For example, U.S. Pat. No. 4,640,575 to Dumas discloses a flexible flap used to cover a fiber optic connector so as to prevent emissions from the connector. The Dumas flexible flap allows forcible deflection of the flap area, so that a mating connector can be attached to the normally covered connector, and yet when the mating connector is removed, the flap will automatically return to the covering position. According to Dumas, in addition to preventing the emission radiations, the flap can reduce contamination materials, such as dust, from adhering to the end of the fiber optic material. Likewise, U.S. Pat. No. 5,202,949 to Hileman, et al. discloses a dust cover for covering one or more fiber optic ferrules of an optical fiber connector. The Hileman dust cover comprises a base portion and at least one protruding portion extending therefrom, the protruding portion having a cavity therein for receiving and covering the ferrule when the dust cover is mounted to the connector. The Hileman dust cover is used in connection with connectors having a retractable body portion which normally surrounds the ferrule when the connector is not in use.

A dust cover 2 for an LC buildout adapter, manufactured in accordance with the prior art, is illustrated in FIGS. 1–4. As the figures demonstrate, the LC adapter includes a base 4 and a cap 6 that removably snaps to the base 4. The LC type adapter is for connecting smaller diameter ferrules, which offer the advantages of being more proportional in size to the fiber optic cable for improved axial alignment and more space efficiency. In particular, the relatively smaller LC connectors and adapters can be more densely packed, at the face of a piece of network equipment for example, and therefore may provide more efficient space management. The dust cover 2 fits within the LC adapter to cover a ferrule sleeve housing 8 to prevent contamination of the optical fiber which fits within the sleeve housing 8.

While optical fiber dust covers of the prior art have generally met the basic needs expressed above, they have experienced a number of problems. In particular, prior art dust covers for fiber optic adapters, such as the LC adapter, have experienced problems of stability and alignment within the deep recesses that are typically present within optical fiber adapter bodies. These deep recesses also often cause problems of placement and removal of the dust covers. When the stability and alignment problems are combined with the placement and removal problems associated with dust covers, the prior art dust covers are often misaligned within the adapter bodies, damaging the dust cover, sleeve housing and the optical fiber.

Accordingly, it would be desirable to provide a fiber optic adapter dust cover that easily functions in adapter caps or bases. It would also be desirable to provide such a dust cover that is accessible in panels having deep recesses and prevents misalignment of the dust cover within the adapter cap or base. Such a dust cover would not only prevent damage to the dust cover itself, it would ensure proper mounting of the dust cover within the adapter assembly, be a prophylactic to contamination of the optical fiber, and protect the sleeve housing and optical fiber from damage.

SUMMARY OF THE INVENTION

These and other objects are provided, according to the present invention, by a dust cover for protecting a sleeve housing of a fiber optic adapter having opposed interior sidewalls. The dust cover of the present invention comprises an elongate member having first and second opposed ends wherein the elongate member has a multifaceted outer surface with at least one planar surface for engaging the opposed interior sidewalls of the fiber optic adapter. The first end of the elongate member is sized and shaped to align the elongate member within the fiber optic adapter and to receive the sleeve housing within a bore defined within the first end. The first end of the elongate member also includes a plurality of landings, which are contiguous the longitudinally extending bore and which are tapered toward the second end of the elongate member. The landings securely hold the sleeve housing within the central bore of the elongate member.

In one embodiment, the elongate member is tapered from the second end toward the first end, and the second end of the elongate member includes a grip for removing the dust cover from the fiber optic adapter. In one embodiment, the dust cover further includes a longitudinally extending central bore defined in the second end of the elongate member. At least a portion of the elongate member may be of a rectangular shape to compliment the interior sidewall surfaces of the adapter.

In still another embodiment, the dust cover includes a plurality of protrusions in the outer surface of the elongate member. The protrusions are molded from a resilient material and are preferably integrally formed with the dust cover.

Consequently, the dust cover of the present invention overcomes limitations found in prior art fiber optic dust covers. In particular, a dust cover for protecting a sleeve housing of a fiber optic adapter according to the present invention is self-aligning, is accessible in panels having deep recesses, and is easily removable from fiber optic adapters. A dust cover in accordance with the present invention not only prevents contamination to the optical fiber, it prevents damage to the dust cover itself, ensures proper mounting and stability of the dust cover within the adapter assembly, and protects the optical fiber from damage which may otherwise result from misalignment of the dust cover.

BRIEF DESCRIPTION OF THE DRAWINGS

Some of the objects and advantages of the invention have been set forth and other objects and advantages of the invention will become apparent in the detailed description of the preferred embodiments of the invention to follow, especially when taken in conjunction with the accompanying drawings, which are not necessarily drawn to scale:

FIG. 10 is a side view of a fiber optic adapter and dust cover assembly in accordance with an embodiment of the present invention;

FIG. 11 is an end view of the fiber optic adapter and dust cover assembly of FIG. 10;

FIG. 12 is a cross-section view of the fiber optic adapter and dust cover assembly of FIG. 10 taken along line A—A of FIG. 11.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
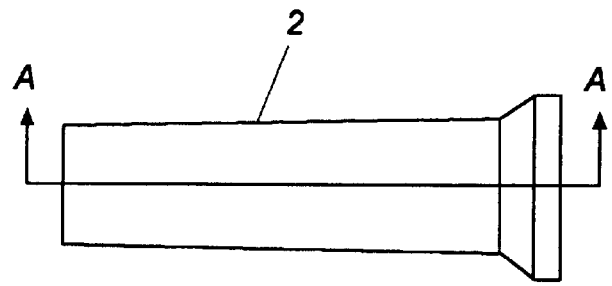
FIGS. 1–4 illustrate a dust cover, for an LC buildout adapter in accordance with the prior art.
Figure 2:
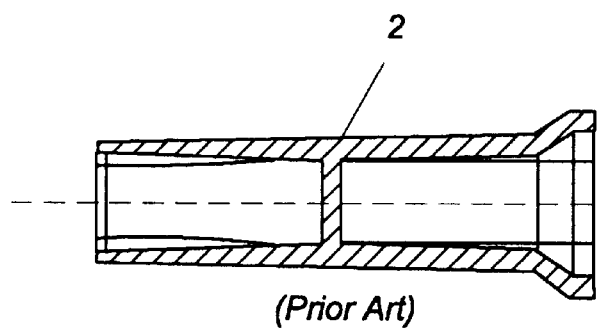
Figure 4:
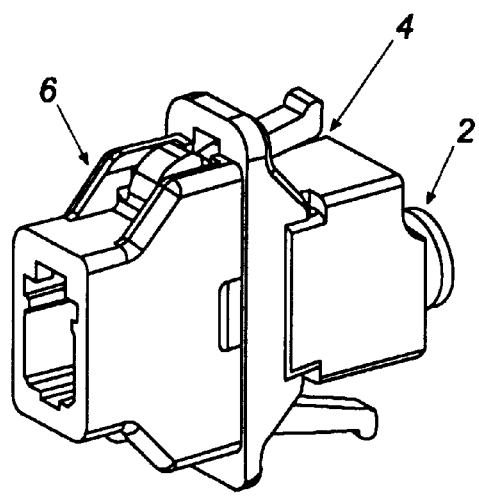
Figure 3:
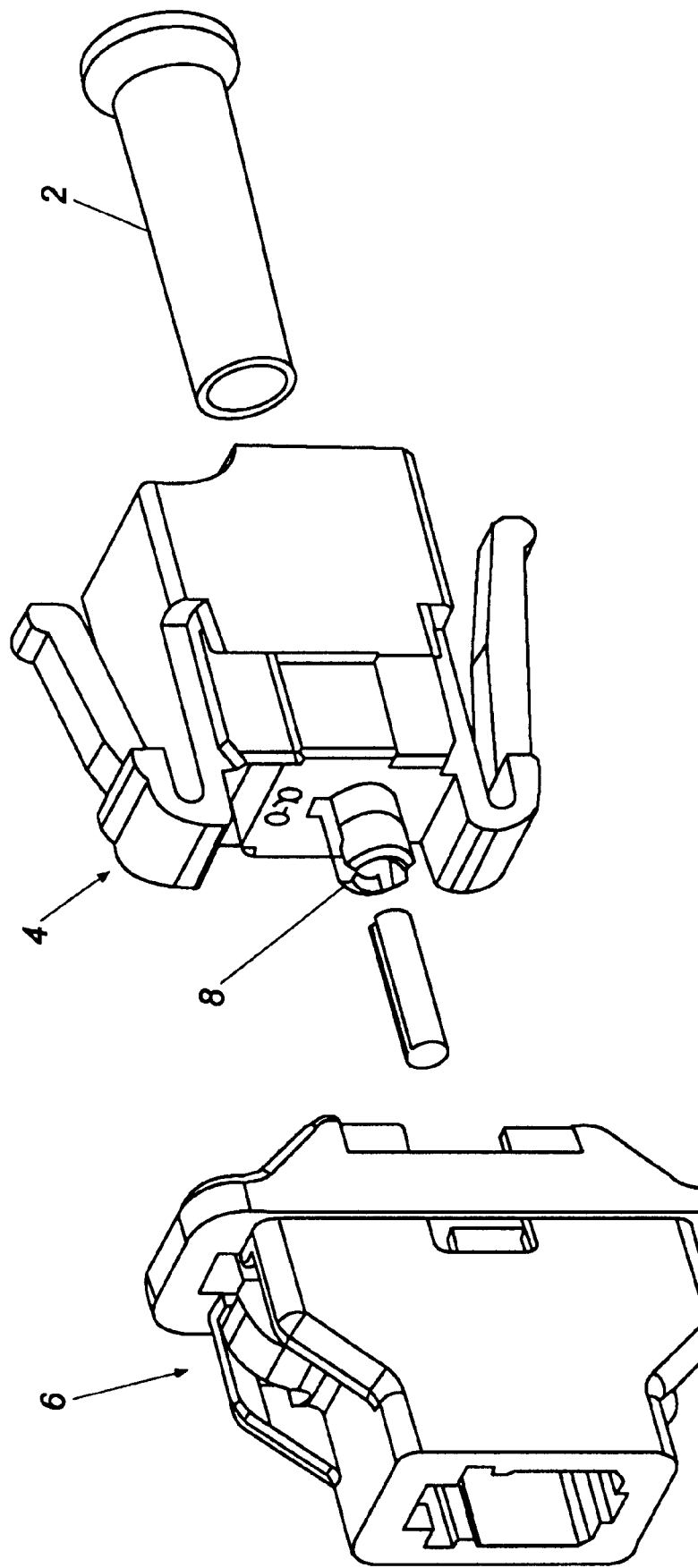
Figure 5:
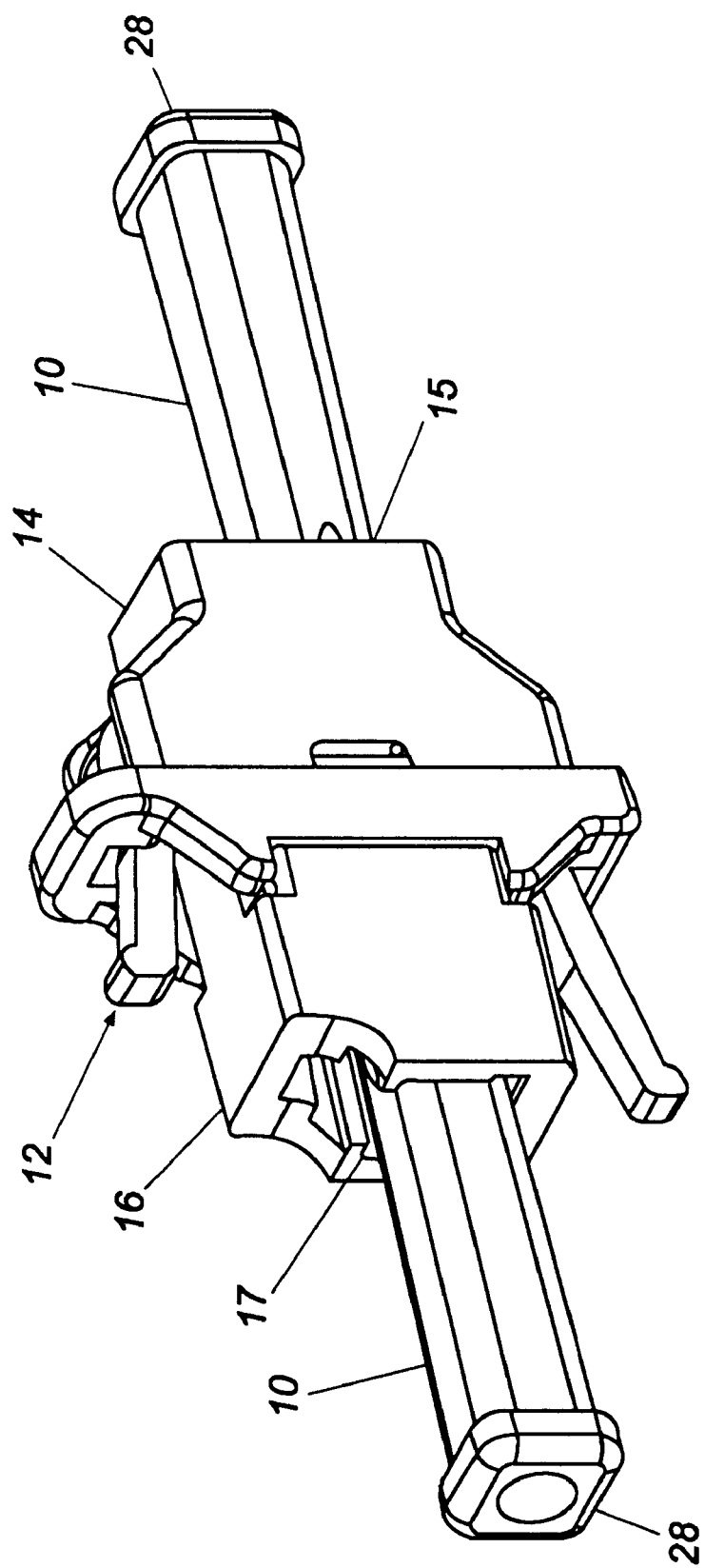
FIG. 5 is an environmental perspective view of dust covers in accordance with an embodiment of the present invention within an LC buildout adapter.

A dust cover 10 according to the present invention is illustrated in FIG. 5 in conjunction with an LC buildout adapter 12. The LC buildout adapter 12 is formed by the union of an adapter base 14 and an adapter cap 16. The adapter 12 is designed to receive two halves of a fiber optic connector (not shown). One half of the connector is received in a cavity 15 of the adapter base 14 and the other half of the connector is received in a cavity 17 of the adapter cap 16. The connector halves form a union within the adapter 12 via a sleeve housing 13 (shown in FIG. 12).

Although illustrated as having a rectangular cross section, the dust cover 10 may have any cross-sectional shape that would sufficiently engage the opposed interior sidewalls of the adapter. One example is a generally hexagonal shape, wherein at least two opposing external, planar wall sections of the dust cover engage opposing internal walls defining cavity 15, 17 of the adapter 12. Likewise, although the dust cover 10 is illustrated in conjunction with an LC buildout adapter, the dust cover of the present invention could be used with a number of different types of couplings or adapters such as, for example, ST® or SC type couplings or adapters. ST® is a registered trademark of Lucent Technologies, Inc.

As illustrated in more detail in FIGS. 6 through 9, the dust cover 10 includes an elongate member 18 which is preferably molded of a resilient thermoplastic material such as Santoprene 253-50. The elongate member 18 has a first end 18a and a second end 18b. The outer surface of the elongate member 18 is multifaceted and shaped to be frictionally received within the buildout adapter 12. The elongate member 18 is received within the adapter 12 at its first end 18a, and advantageously may be received within either the cavity 15 of the adapter base 14 or the cavity 17 of the adapter cap 16. Accordingly, lateral or vertical movement of the second end 18b is minimized once inserted within adapter 12.

In the embodiment illustrated, the elongate member 18 has a rectangular cross-section tapered from the second end 18b toward the first end 18a to cooperate with the rectangular cross-section of the LC adapter 12 and to properly align the dust cover 10 within the adapter 12. Indeed, the rectangular cross-section of the dust cover 10 ensures that the dust cover 10 cannot be misaligned within the LC adapter 12. The elongate member 18 is also advantageously lengthy, which allows ease of placement and removal of the dust cover 10 within the deep recesses that are often associated with fiber optic adapters. The cross-section of the dust cover 10 likewise advantageously prevents rotational movement of the dust cover 10 once the first end 18a engages the sleeve housing 13, thereby further protecting the unconnected optical fiber.

Figure 6:
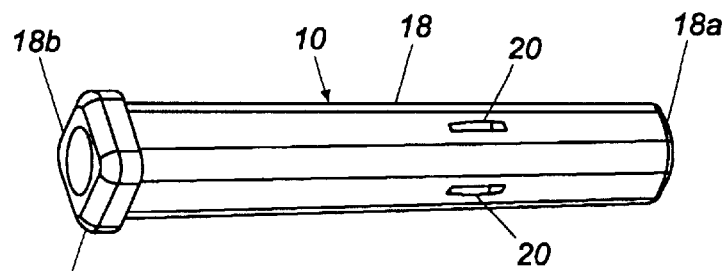
FIG. 6 is a perspective view of a dust cover in accordance with an embodiment of the present invention.

As shown in FIG. 6, the outer surface of the elongate member 18 includes a plurality of protrusions 20 spaced around the circumference of the elongate member 18. The protrusions 20 are preferably integrally formed with the elongate member 18, and comprise a resilient thermoplastic material such as Santoprene 253-50. In this arrangement, when the first end 18a is inserted within the adapter 12 and the elongate member 18 is slid within either cavity 15 or cavity 17 of the adapter 12, the protrusions 20 provide frictional engagement, support, and alignment surfaces to the dust cover 10.

Figure 7:
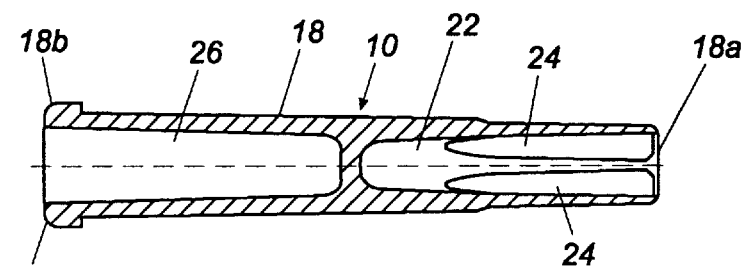
FIG. 7 is a cross-section view of the dust cover of FIG. 6.
Figure 8:
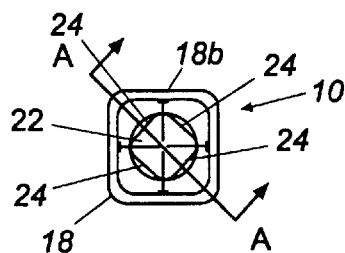
FIG. 8 is an end view of the dust cover of FIG. 6.
Figure 9:
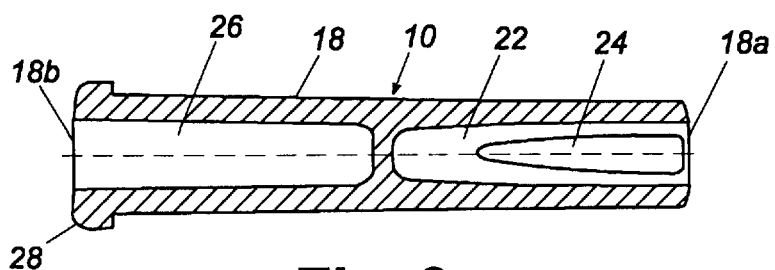
FIG. 9 is a cross-section view of the dust cover of FIG. 8 taken along line A—A.

Referring now to FIGS. 7 through 9, the elongate member 18 also includes a longitudinally extending central bore 22 defined in the first end 18a, and a plurality of landings 24 that are contiguous or adjacent the central bore 22. The plurality of landings 24 are tapered from the first end 18a toward the second end 18b of the elongate member 18. In the embodiment illustrated, the elongate member 18 also includes a bore 26 in the second end 18b. As those skilled in the art will understand, the bore 26 is included in the end 18b for material savings and ease of molding the elongate member 18.

As best demonstrated by FIGS. 10 through 12, when the dust cover 10 is placed within the adapter 12, the dust cover 10 is first aligned within the adapter 12 by virtue of the rectangular cross section of the elongate member 18 and its tapered outer surface. Referring specifically to FIG. 12, as the dust cover 10 continues to slide within the adapter 12, the sleeve housing 13 of the adapter 12 penetrates the central bore 22 of the first end 18a of the elongate member 18. As the sleeve housing 13 continues to slide into the central bore 22 of the elongate member 18, the sleeve housing 13 engages the tapered landings 24 and becomes snugly engaged by the landings 24.

At substantially the same time, the protrusions 20 on the outer surface of the elongate member 18 (shown in FIG. 6) engage the inner surface of the cavity 15, 17 of the adapter 12. As the dust cover 10 continues to slide within the adapter 12, the resilient protrusions 20 slightly yield to frictionally secure the dust cover 10 within the adapter 12 as the first end 18a of the elongate member 18 seats within the adapter 12, preferably abutting the wall 29. Consequently, the central bore 22, the tapered landings 24, and the protrusions 20 all cooperate to align and securely engage the dust cover 10 within the adapter 12.

To facilitate placement and removal of the dust cover 10 within the adapter 12, a grip 28 is included at the second end 18b of the elongate member 18 of the dust cover 10. In the embodiment illustrated, the grip 28 has a rectangular cross-section, but may have any cross-section that would be conducive to gripping the dust cover 10.

Figure 13:
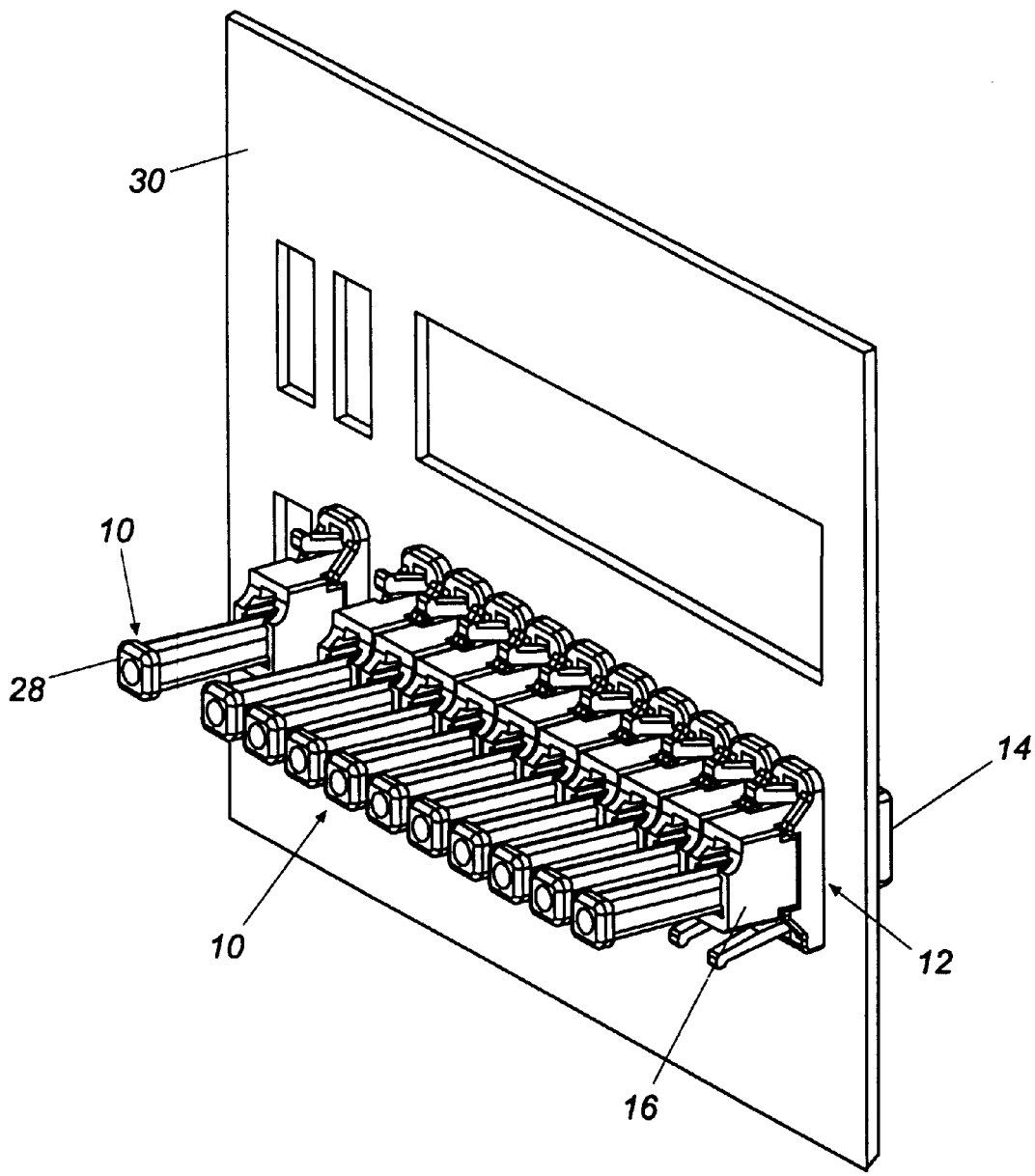
FIG. 13 is a perspective view of a fiber optic adapter and dust cover assembly panel in accordance with an embodiment of the present invention.

Often it becomes necessary to arrange a plurality of optical fiber connectors in a panel to facilitate multifiber connections. Desirably, as shown in FIG. 13, couplings or adapters 12 are mounted in a panel 30, but the connectors themselves are not connected to incoming or outgoing fiber optic paths until needed to provide service. As FIG. 13 illustrates, a plurality of dust covers 10 in accordance with the present invention may be included with the adapters 12 to protect unconnected fiber paths from contamination. The dust covers 10 are particularly advantageous for use in connection with limited space applications such as the fiber optic panel 30 of adapters because of the alignment characteristics of the dust covers 10 and ease with which the dust covers 10 may be placed into and removed from the adapters 12. As optical fiber connectors become smaller and smaller, the functional characteristics of the dust cover 10, as discussed herein before, become even more desirable, as will be appreciated by those of ordinary skill in the art.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. For example, although the dust cover of the present invention is illustrated in conjunction with an LC buildout adapter, those skilled in the art will understand that the dust cover of the present invention could be used with a number of different types of couplings or adapters such as, for example, ST® or SC type couplings or adapters. Although specific terms are employed herein, they are used in a generic and descriptive sense only and not for the purposes of limitations.

That which is claimed is:

1. A dust cover for protecting a sleeve housing of a fiber optic adapter having opposed interior sidewalls, said dust cover comprising:

an elongate member having first and second opposed ends and defining a longitudinal axis, wherein said elongate member has a multifaceted outer surface having at least one planar surface for engaging the opposed interior sidewalls of the fiber optic adapter;

said first end of said elongate member sized and shaped to align said elongate member within the fiber optic adapter and receive the sleeve housing, said first end including;

a longitudinally extending central bore defined in said first end for receiving the sleeve housing, and a plurality of landings contiguous said longitudinally extending bore and tapered toward said second end to securely hold the sleeve housing within said central bore.

2. A dust cover for protecting a sleeve housing of a fiber optic adapter as defined in claim 1, said dust cover further comprising a plurality of protrusions in said outer surface of said elongate member.

3. A dust cover for protecting a sleeve housing of a fiber optic adapter as defined in claim 1, further comprising a grip located adjacent said second end of said elongate member.

4. A dust cover for protecting a sleeve housing of a fiber optic adapter as defined in claim 1 wherein said outer surface of said elongate member is tapered from said second end toward said first end.

5. A dust cover for protecting a sleeve housing of a fiber optic adapter as defined in claim 1 wherein at least a portion of said elongate member is rectangular.

6. A dust cover for protecting a sleeve housing of a fiber optic adapter as defined in claim 1, further comprising a longitudinally extending central bore defined in said second end of said elongate member.

7. A dust cover for protecting a sleeve housing of a fiber optic adapter having opposed interior sidewalls, said dust cover comprising:

an elongate member having first and second opposed ends and defining a longitudinal axis, wherein said elongate member has a multifaceted outer surface having at least one planar surface for engaging the opposed interior sidewalls of the fiber optic adapter;

a plurality of protrusions in said outer surface of said elongate member; and said first end of said elongate member sized and shaped to align said elongate member within the fiber optic adapter and receive the sleeve housing, said first end including a longitudinally extending central bore defined in said first end for receiving the sleeve housing.

8. A dust cover for protecting a sleeve housing of a fiber optic adapter as defined in claim 7 wherein said protrusions are molded from a resilient material.

9. A dust cover for protecting a sleeve housing of a fiber optic adapter as defined in claim 7, further comprising a grip located adjacent said second end of said elongate member.

10. A dust cover for protecting a sleeve housing of a fiber optic adapter as defined in claim 7 wherein said outer surface of said elongate member is tapered from said second end toward said first end.

11. A dust cover for protecting a sleeve housing of a fiber optic adapter as defined in claim 7 wherein at least a portion of said elongate member is rectangular.

12. A dust cover for protecting a sleeve housing of a fiber optic adapter as defined in claim 7, further comprising a longitudinally extending central bore defined in said second end of said elongate member.

13. A fiber optic adapter and dust cover assembly, said assembly comprising:
   a fiber optic adapter base having opposed interior sidewalls;
   a fiber optic adapter cap having opposed interior sidewalls and a sleeve housing, said adapter cap capable of being received into said adapter base;
   a dust cover, said dust cover including,
   an elongate member having first and second opposed ends and defining a longitudinal axis, wherein said elongate member has a multifaceted outer surface having at least one planar surface capable of engaging said opposed interior sidewalls of said fiber optic adapter base and said opposed interior sidewalls of said fiber optic adapter cap;
   said first end of said elongate member sized and shaped to align said elongate member within the fiber optic adapter and receive the sleeve housing, said first end including;
   a longitudinally extending central bore defined in said first end for receiving the sleeve housing, and
   a plurality of landings contiguous said longitudinally extending bore and tapered toward said second end to securely hold the sleeve housing within said central bore.

14. A fiber optic adapter and dust cover assembly as defined in claim 13, said dust cover further comprising a plurality of protrusions in said outer surface of said elongate member.

15. A fiber optic adapter and dust cover assembly as defined in claim 13, said dust cover further comprising a grip located adjacent said second end of said elongate member.

16. A fiber optic adapter and dust cover assembly as defined in claim 13 wherein said outer surface of said elongate member is tapered from said second end toward said first end.

17. A fiber optic adapter and dust cover assembly as defined in claim 13 wherein at least a portion of said elongate member is rectangular.

18. A fiber optic adapter and dust cover assembly as defined in claim 13, said dust cover further comprising a longitudinally extending central bore defined in said second end of said elongate member.

19. A fiber optic adapter and dust cover assembly panel, said assembly panel comprising:
   a panel base;
   a plurality of fiber optic adapters secured within said panel base, each said fiber optic adapter having opposed interior sidewalls and at least one sleeve housing;
   a plurality of dust covers, each said dust cover including,
   an elongate member having first and second opposed ends and defining a longitudinal axis, wherein said elongate member has a multifaceted outer surface having at least one planar surface for engaging said opposed interior sidewalls of each said fiber optic adapter;
   said first end of said elongate member sized and shaped to align said elongate member within the fiber optic adapter and receive the sleeve housing, said first end including;
   a longitudinally extending central bore defined in said first end for receiving said sleeve housing, and
   a plurality of landings contiguous said longitudinally extending bore and tapered toward said second end to securely hold said sleeve housing within said central bore.

20. A fiber optic adapter and dust cover assembly panel as defined in claim 19, each said dust cover further comprising a plurality of protrusions in said outer surface of said elongate member.

21. A fiber optic adapter and dust cover assembly panel as defined in claim 19, each said dust cover further comprising a grip located adjacent said second end of said elongate member.

22. A fiber optic adapter and dust cover assembly as defined in claim 19 wherein said outer surface of said elongate member is tapered from said second end toward said first end.

23. A fiber optic adapter and dust cover assembly panel as defined in claim 19 wherein at least a portion of said elongate member is rectangular.

24. A fiber optic adapter and dust cover assembly as defined in claim 19, each said dust cover further comprising a longitudinally extending central bore defined in said second end of said elongate member.

* * * * *